April 5, 1927.
E. LUNDGREN
STOKER
Filed May 4, 1923
1,623,424
6 Sheets-Sheet 1
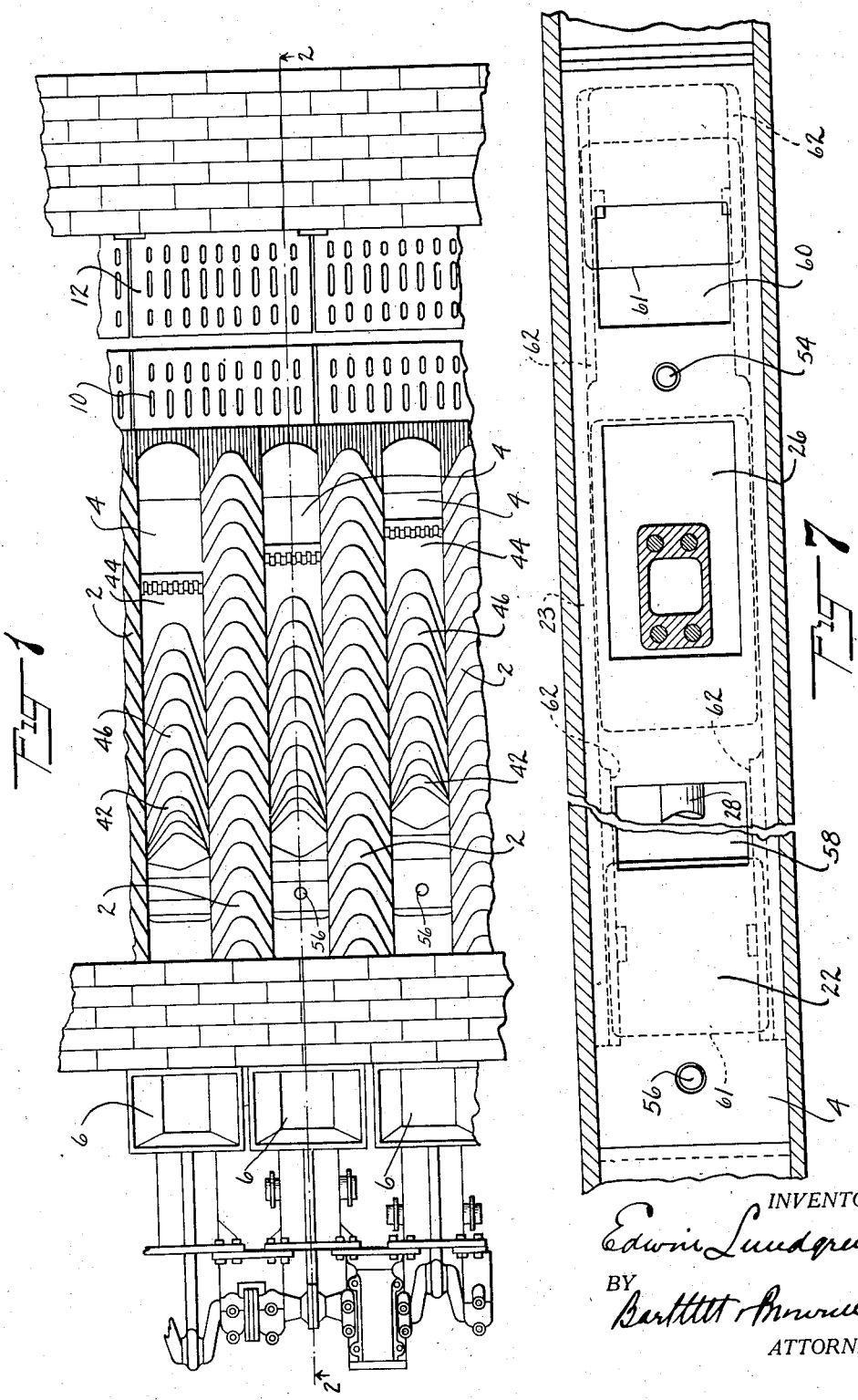

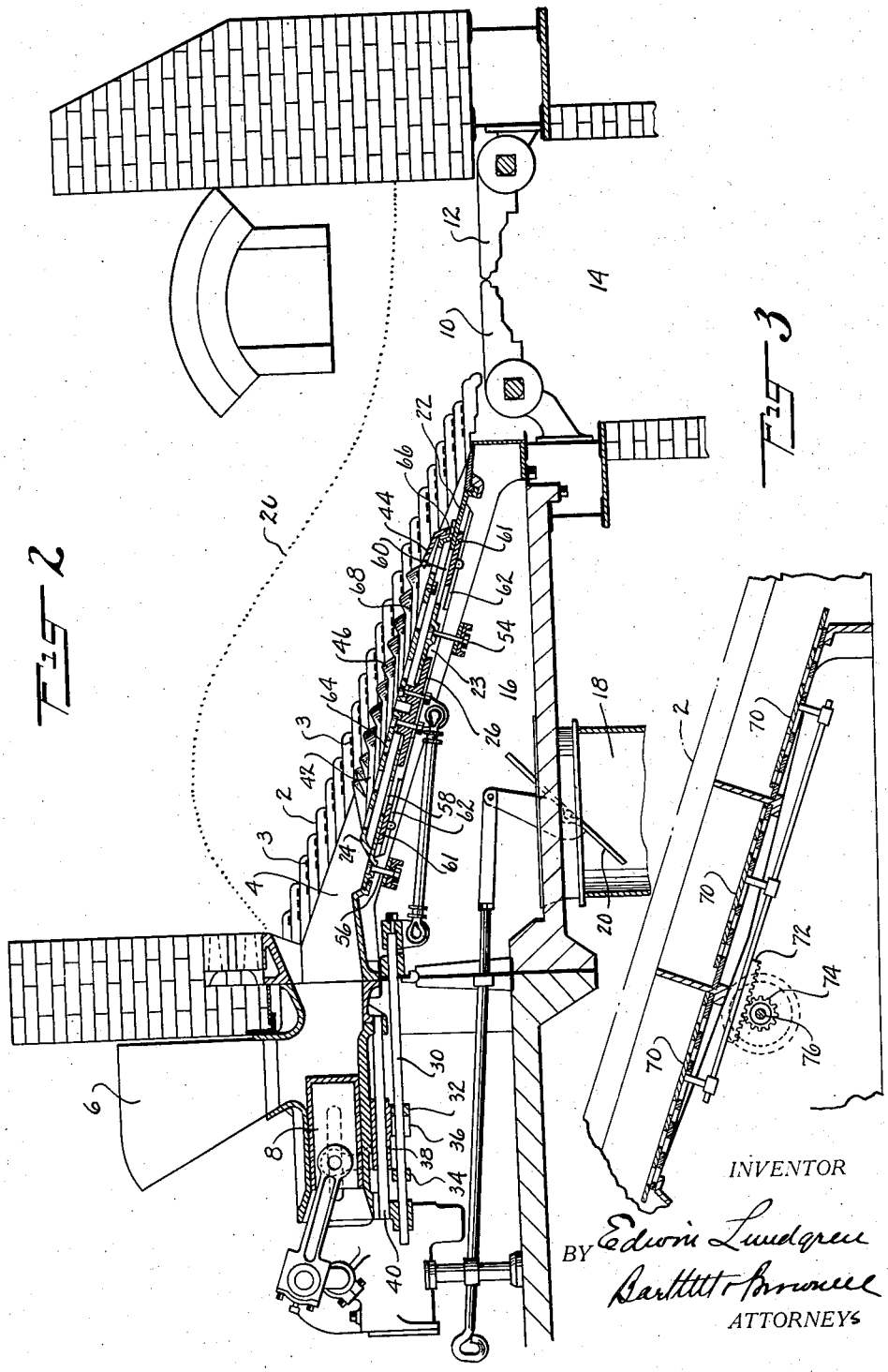

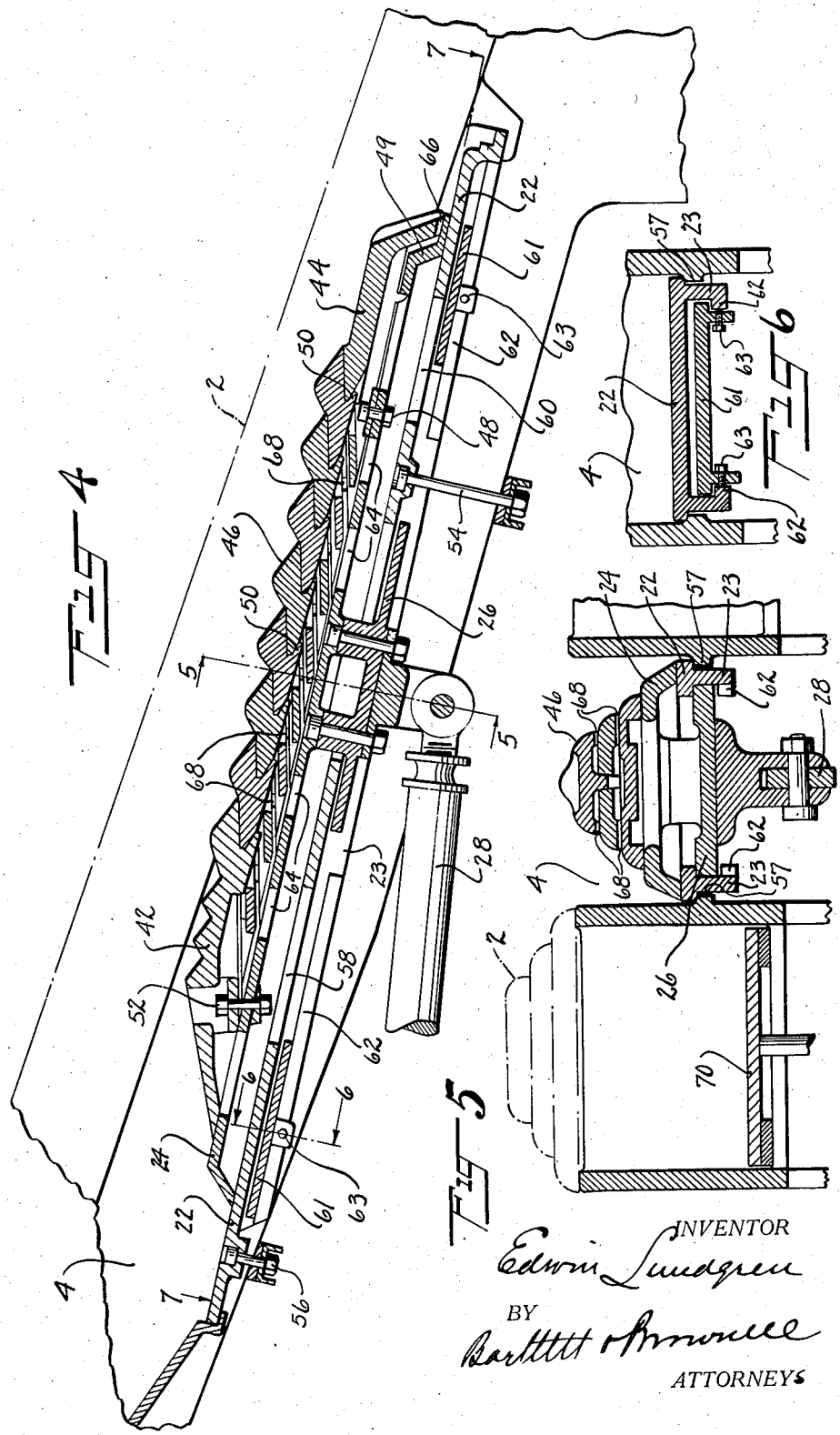

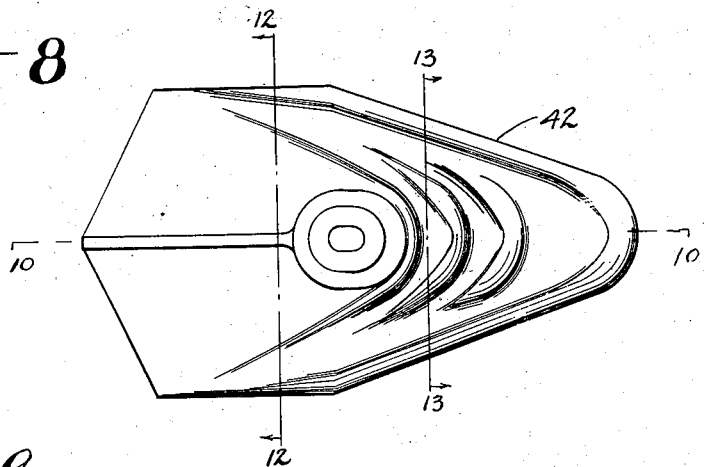
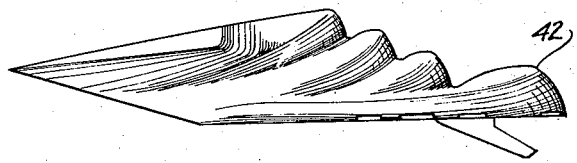
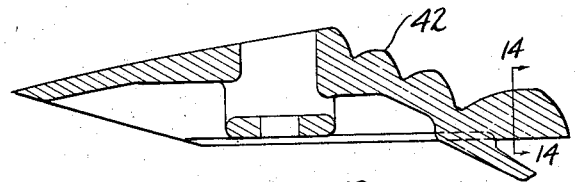
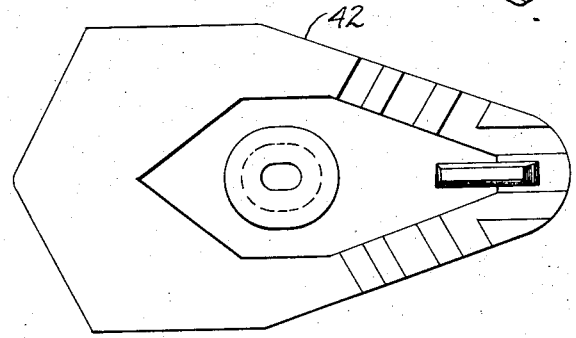
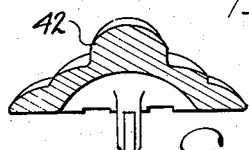

INVENTOR
Edwin Lundgren
BY
ATTORNEYS

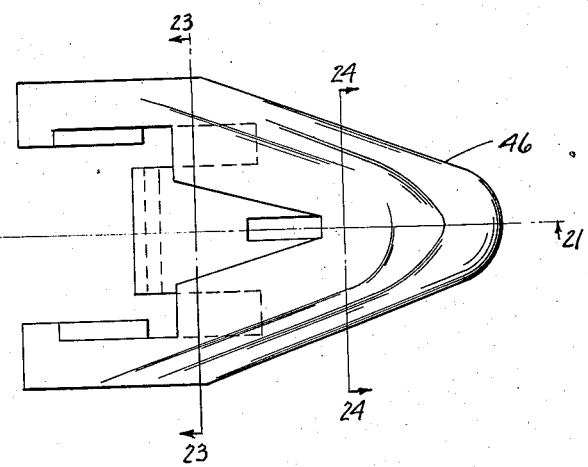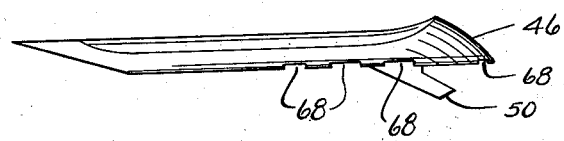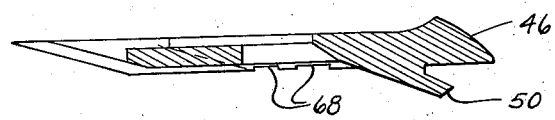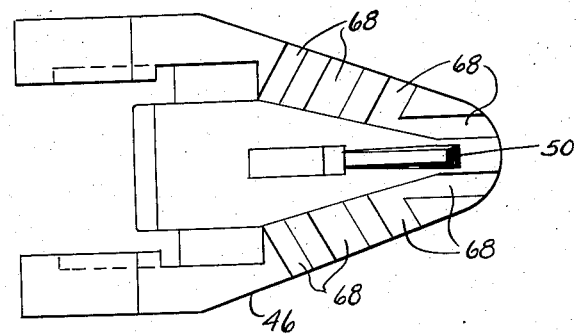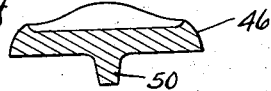

Patented Apr. 5, 1927.

1,623,424

UNITED STATES PATENT OFFICE.

EDWIN LUNDGREN, OF FREDERICK, MARYLAND, ASSIGNOR TO COMBUSTION ENGINEERING CORPORATION, OF NEW YORK, N. Y., A CORPORATION OF NEW YORK.

STOKER.

Application filed May 4, 1923. Serial No. 636,523.

My invention relates to improvements in underfeed stokers and is particularly applicable to inclined underfeed stokers of the multiple retort type. The principal object of my invention is to provide a retort underfeed stoker having an increased fuel burning capacity per retort. It further has for its object to provide a stoker in which substantially the entire retort area is utilized as an active grate surface. It further has for its object to provide such a stoker having a fuel support which is practically 100% effective grate surface. A further object of the invention is to utilize the secondary fuel feeding ram as an active grate surface, admitting air into the fuel bed. A further object is to provide an active grate surface between the grate surfaces adjoining the retort having the feature of being supplied with a separately controlled amount of air. A further object of my invention is to provide means by which the air passing through the rams and through the stationary tuyères respectively can be independently controlled so that the air passing through either or both of those two kinds of grate surfaces can be independently throttled or cut off. A further object is to provide a stoker of the type mentioned with a variable active fuel burning surface in order to vary the fuel burning efficiency as desired. A further object is to provide a retort stoker having a ram producing a novel forward and lateral fuel feeding action.

It is well known that stokers of the inclined multi-retort type, generally stated, have their best fuel burning efficiency when the average fuel being burned is 30 to 40 pounds of coal per square foot of grate surface, and that when operated at higher combustion rates the combustion efficiency decreases rapidly, requiring relatively high air pressure for the combustion of the fuel. By means of the improved form of stoker herein shown and described, the secondary fuel feeding rams can be utilized either as a feeding means only, producing a relatively low combustion rate, or can be converted into active grate surfaces supplying air to the superimposed fuel so as to secure with the same air pressure higher combustion rates equal to those secured by the use of a larger stoker, making it unnecessary to install a larger stoker in order to obtain the higher combustion efficiency corresponding to the most economical combustion rate.

The following is a description of an embodiment of my invention, reference being had to the accompanying drawings, in which, Figure 1 shows a plan view of a portion of a stoker furnace embodying my invention;

Fig. 2 is a transverse section of the same on the line 2—2, Fig. 1;

Fig. 3 is a sectional view of parts showing one of the stationary tuyères with its air controlling damper;

Fig. 4 is an enlarged view of the pusher within one of the retorts, intermediate portions being broken away;

Fig. 5 is a section on the line 5—5, Fig. 4;

Fig. 6 is a section on the line 6—6, Fig. 4;

Fig. 7 is a section on the line 7—7, Fig. 4;

Fig. 8 is a detail plan view of the top member of the pusher;

Fig. 9 is a side elevation of the same;

Fig. 10 is a section on the line 10—10, Fig. 8;

Fig. 11 is a bottom plan view;

Fig. 12 is a section on the line 12—12, Fig. 8;

Fig. 13 is a section on the line 13—13, Fig. 8;

Fig. 14 is a section on the line 14—14, Fig. 10;

Fig. 19 is a detail plan view of one of the similar intermediate sections;

Fig. 20 is a side elevation of the same;

Fig. 21 is a section on the line 21—21, Fig. 19;

Fig. 22 is a bottom plan view;

Fig. 23 is a section on the line 23—23, Fig. 19; and

Fig. 24 is a section on the line 24—24, Fig. 19.

Figure 15:
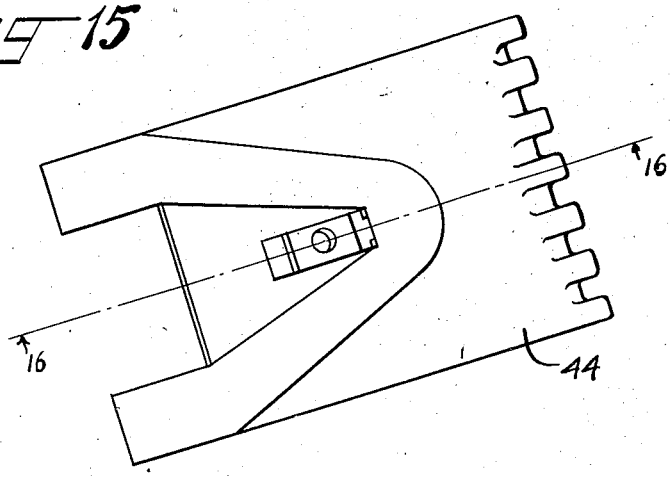
Fig. 15 is a detail plan view of the lowermost member of the pusher.
Figure 16:
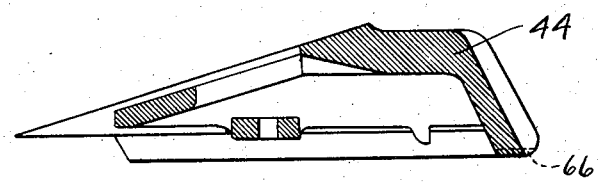
Fig. 16 is a section on the line 16—16, Fig. 15.
Figure 17:
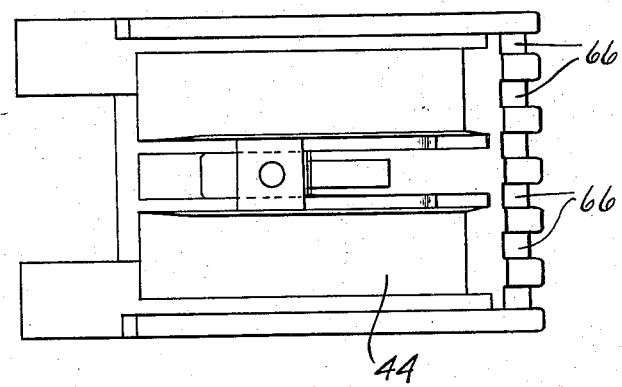
Fig. 17 is a bottom plan view.
Figure 18:
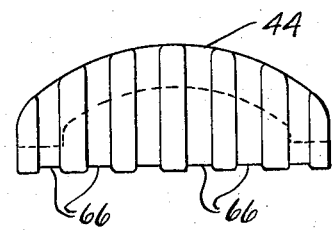
Fig. 18 is an end elevation of said member.

Referring more particularly to the drawings, 2—2—2 are inclined series of stationary tuyères alternating with retorts 4, each of which retorts is supplied with fuel from a hopper 6 by means of main plungers 8 in the ordinary underfeed manner, the stationary tuyères having the usual discharge openings 3. 10 and 12 are the usual dump grates located at the lower end of the inclined series of stationary tuyères and adapted to discharge refuse into the ash pit 14. Extending below the retorts 4 and the stationary tuyères 2 is a chamber 16 supplied with air from a duct 18, the supply being controlled by the damper 20. The retorts 4 are each provided with a bottom plate 22 on which slides an auxiliary pusher consisting of a base plate 24 which is secured to an under plate 26 to which is pivotally connected a rod 28 which in turn is connected to a sliding rod 30 having spaced abutments 32 and 34 which are alternately engaged by a projection 36 upon a slide 38 supported by the guide-rod 40 and connected so as to move with the plunger 8, except for the lost motion between the projections 36 and the abutments 32 and 34, thus causing the base plate 24 to reciprocate within the retort 4. The parts mentioned, except the auxiliary pusher hereinafter to be described in detail, are similar to arrangements heretofore used and familiar to those skilled in the art.

Upon the base plate 24 are mounted upper and lower pusher members 42 and 44, between which is mounted a series of tuyère blocks 46 similar to one another and constituting intermediate pushing members. The lower member 44 is secured to the base plate by a bolt 48 and a projection 49 which enters a recess in the end face of the member 44. The lower intermediate member rests partially upon the base plate 24 and partially upon the lower pushing member 44, being provided with a rearwardly and downwardly extending tongue 50 which hooks beneath the upper edge of the member 44. The succeeding intermediate members are similarly related to the preceding intermediate members and are secured thereto in a similar manner. The upper pusher member 42 rests partially upon the uppermost intermediate member and partially upon the base plate 24 and is secured to the base plate by a bolt 52 so that the upper and lower pusher members and the intermediate members are all fixed in relation to one another and to the base plate. The base plate is held down upon the bottom plate 22 by the under plate 26, to which it is bolted so as to be free to slide upon the base plate. The plate 22 is provided with depending strengthening flanges 23 and is secured in position by bolts 54 and 56 which hold it against flanges 57 on the side walls of the retort.

The plate 22 has openings 58 and 60, which can be wholly or partially closed by sliding dampers 61 resting on ledges 62 formed on the flanges 23 and secured in adjusted position by set-screws 63 as shown. The base plate 24 is provided with openings 64 through which air can pass to the under side of members 42, 44 and 46. The member 44 has in its forward end a series of bottom grooves forming air ports 66 through which part of this air is discharged to the fuel in advance thereof. Each of the intermediate members has on its bottom faces grooves 68 through which the air supplied to their under sides to the ports 64 is discharged. The upper member 42 is provided on its under face with similar air discharge ports. The intermediate members are of skeleton form so as to form in conjunction with the upper and lower members an air chamber into which the ports 64 of the base plate open to admit air subject to the control of the dampers 61.

The auxiliary pusher thus constructed is reciprocated to feed the fuel through the retort in which it is located, and, on account of its grate-like construction, constitutes an active grate surface on which the overlying fuel is burned, thus serving not only to move the fuel through the respective retorts but also serving as an air supply grate, with the result that the effective grate area of the stoker is increased and corresponds to substantially 100 per cent of the fuel supporting surface of the stoker, resulting in an increased capacity of the stoker and permitting a higher rate of combustion than has heretofore been attained in stokers of the multi-retort type.

The feeding surfaces of the rams are arranged to give a relatively large pushing surface at the lower ends of the rams in order to obtain a positive feeding effect of the fuel bed at the lower part of the retorts. The uppermost grate units preferably have smaller feeding surfaces as the feeding effect upon the fuel bed at the upper portion of the ram is greatly controlled by the main feeding ram of the stoker. The upper portion of the auxiliary pusher projects so as to provide a greater agitating surface than the agitating surfaces of the intermediate units, since the fuel bed requires considerable agitation at the upper end of the retort due to the thick fuel bed at this point. The normal outline of the fuel bed for best operation is shown in dots by the line 20. The upper and intermediate members 42 and 46 of the pushers are moreover tapered rearwardly so as to act as plows tending to shove the fuel laterally toward the fixed tuyères and in order to give the fuel a shove in an upwardly inclined direction the pushing faces 42 and 46 are in addition somewhat rounded as shown more particularly in Fig. 4 so that they not only have a forward propelling action and a lateral propelling action but also have an upwardly inclined propelling action, resulting in an even distribution of the fuel, which, combined with the supply of air through the pushing members, as well as through the stationary tuyères, results in a substantially uniform surface of burning fuel throughout the furnace and thereby increases the capacity and efficiency of the furnace.

In addition to the means 61 for controlling the air admitted through the auxiliary pushers I also provide sliding dampers 70 which are provided with racks 72 with which engage pinions 74 mounted upon a transversely extending shaft 76 so that they can be moved whenever desired to throttle the air passing to the stationary tuyères. In this way the air in passing to the stationary tuyères can be controlled independently of the air passing through the movable rams into the retorts. Since the amount of air passing through the rams can also be adjusted by the means heretofore described, the air supply to all portions of the effective grate surface can be adjusted to meet varying conditions. The means for adjusting and securing the dampers 61 controlling the air supply to the ports in the auxiliary pushers do not have to be adjustable by means extending outside of the furnace, since these adjustments ordinarily are necessary only when a change in the nature of the fuel used is made and when once adjusted so as to meet that condition should not require further adjustment during the ordinary running of the furnace. It is to be noted that the two dampers for controlling the air to each auxiliary pusher are independent of one another and therefore can be independently adjusted so as to control the air admitted to different parts of each pusher as well as to shut it off altogether.

The main rams underfeed to the retorts the fuel received from the hopper, which, when it reaches the auxiliary pushers, is fed by those pushers so as to be supplied to the stationary tuyères. The fuel is fed to the stationary tuyères in an ignited condition having become quickly ignited as soon as exposed to the heated atmosphere of the furnace on account of the oxygen being supplied to it. The action of the stoker so far as the stationary tuyères is concerned is underfeed while the action so far as feeding the fuel along the grate surfaces of the auxiliary rams is concerned is overfeed so that the fuel which is being consumed is partly underfed and partly overfed as contrasted with the multiple retort stoker heretofore used in which the fuel fed to active grate surfaces was always underfed.

As will be evident to those skilled in the art my invention permits of various modifications without departing from the spirit thereof or the scope of the appended claims.

What I claim is:

1. In a multiple retort stoker, the combination of a plurality of retorts, means for underfeeding fuel to said retorts, an overfeed grate surface within each of said retorts and extending throughout the major portion thereof, means for supplying air to said overfeed grate surface, and means for controlling the supply of air to one longitudinally extending part of said overfeed grate surface independently of another such part of said surface.

2. A stoker having, in combination, a retort having a bottom wall having an opening therein, a fuel pusher having a base of hollow construction mounted to slide on said bottom wall over said opening and having its interior in communication therewith, and tuyère structures removably mounted on said base and having tuyère openings therein in communication with the interior of said base.

3. A stoker having, in combination, a retort having a bottom wall having an opening therein, a fuel pusher having a base of hollow construction mounted to slide on said bottom wall over said opening and having is interior in communication therewith, and tuyère structures removably mounted on said base, in interlocking engagement with each other and having tuyère openings in communication with the interior of said base.

4. A stoker having, in combination, a retort having a bottom wall having an opening therein, a fuel pusher having a base of hollow construction mounted to slide on said bottom wall over said opening and having its interior in communication therewith, and tuyère structures removably mouned on said base, having a tongue and slot connection between them and having tuyère openings in communication with the interior of said base.

5. A stoker having, in combination, a retort having a bottom wall having an opening therein, a fuel pusher having a base of hollow construction mounted to slide on said bottom wall over said opening and having its interior in communication therewith, and tuyère structures removably mounted on said base and arranged one above the other in overlapping relation so as to form a series of pushing faces.

6. A multiple retort stoker having, in combination, a plurality of retorts arranged side by side and spaced apart, tuyère structures extending between the adjacent side walls of adjacent retorts, a wind box arranged beneath the retorts and tuyère structures, an overfeed grate surface within each retort, and independently controllable means for admitting air from said wind box to said overfeed grate surface and said rows of tuyère structures.

7. A stoker having, in combination, a plurality of retorts arranged side by side and spaced apart, tuyère structures extending between the adjacent side walls of adjacent retorts, a wind box arranged beneath the retorts and tuyère structures, a fuel pusher mounted in each retort of hollow construction and having openings therein for admitting air to the fuel within the retort, and controllable means for admitting air from the wind box to each of said fuel pushers.

8. A stoker having, in combination, a retort, a fuel pusher mounted for reciprocating movement within the retort having a hollow base and tuyère structures mounted on said base and arranged in overlapping relation so as to form a series of pushing faces arranged one behind the other, and means for admitting air to the interior of said pusher.

9. A stoker having, in combination, a retort, a fuel pusher extending longitudinally of the retort of hollow construction and having a plurality of openings for admitting air to the fuel within the retort, means for supplying air to the interior of the fuel pusher, and means for controlling the supply of air to one longitudinally extending part of the interior of said pusher independently of another such part of said pusher.

10. A stoker having, in combination, a retort having side walls and a bottom wall, a row of tuyère structures mounted upon the upper edge of each of said side walls, a fuel pusher comprising a base mounted to slide longitudinally on said bottom wall, and tuyère blocks mounted upon said base in overlapping relation to provide a series of pushing faces arranged one behind the other, and to supply air to the fuel within the retort, said tuyère blocks extending above the lower edges of said rows of tuyère structures but spaced below the top surfaces thereof, said bottom wall and base having openings for supplying air to said tuyère blocks, and means for reciprocating said pusher longitudinally.

11. A stoker having, in combination, a retort having a bottom wall inclined downwardly and rearwardly, a fuel pusher having a base mounted to slide longitudinally on said bottom wall and extending from near the upper end of said bottom wall to near the lower end thereof, and tuyère blocks mounted on said base in overlapping relation to provide a series of pushing faces arranged one behind the other, said tuyère blocks extending substantially from end to end of said base and of substantially the width of the interior of the retort, and said bottom wall and base having openings for supplying air to said tuyère blocks, and means for reciprocating said pusher longitudinally.

12. A stoker having, in combination, a retort having side walls and a bottom wall inclined downwardly and rearwardly and extending between the side walls, a row of tuyère structures mounted upon the upper edge of each of said side walls, a fuel pusher having a base mounted to slide longitudinally on said bottom wall, and tuyère blocks mounted on said base and arranged to support and to supply air to the transverse central portion of the fuel within the retort, and said bottom wall and base having openings for supplying air to said tuyère blocks, and means for reciprocating said pusher.

13. A stoker having in combination, a retort having a bottom wall inclined downwardly and rearwardly, a fuel pusher having a base mounted to slide longitudinally on said bottom wall having its top surface arranged substantially parallel with said bottom wall, and tuyère blocks mounted upon the top surface of said base in overlapping relation for supplying air to the fuel within the retort and for providing a series of pushing faces arranged one behind the other for feeding fuel down the retort during the reciprocation of the pusher, said bottom wall and said base having openings for supplying air to said tuyère blocks, and means for reciprocating said pusher longitudinally.

14. A stoker having, in combination, a retort having a bottom wall inclined downwardly and rearwardly, a fuel pusher having a base mounted to slide longitudinally on said bottom wall having its top surface arranged substantially parallel with said bottom wall, and tuyère blocks mounted upon the top surface of said base in overlapping relation for supplying air to the fuel within the retort and for providing a series of pushing faces arranged one behind the other for feeding the fuel down the retort during the reciprocation of the pusher, the overlapping surface portions of said blocks being arranged substantially horizontal, and said bottom wall and said base having openings for supplying air to said tuyère blocks, and means for reciprocating said pusher longitudinally.

15. A stoker having, in combination, a retort having side walls and a bottom wall inclined downwardly and rearwardly and extending between the side walls, a row of tuyère structures mounted upon the upper edge of each of said side walls, a fuel pusher having a portion of its top surface provided with tuyère openings and arranged to support and to supply air to the central and lower portions of the fuel within the retort and provided with a plurality of steps forming fuel pushing faces extending above the lower edges of said rows of tuyère structures but spaced below the top surfaces of the tuyère structures, means for supplying air to said tuyère openings in the pusher, and means for reciprocating said pusher longitudinally.

EDWIN LUNDGREN.